(12) United States Patent
Wei

(10) Patent No.: US 10,498,938 B2
(45) Date of Patent: Dec. 3, 2019

(54) IMAGING CAMERA

(71) Applicant: AAC Technologies Pte. Ltd., Singapore (SG)

(72) Inventor: Chuandong Wei, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/236,307

(22) Filed: Dec. 28, 2018

(65) Prior Publication Data
US 2019/0253587 A1    Aug. 15, 2019

(30) Foreign Application Priority Data

Feb. 9, 2018   (CN) .................... 2018 2 0249534 U

(51) Int. Cl.
*H04N 5/225*   (2006.01)

(52) U.S. Cl.
CPC ......... *H04N 5/2254* (2013.01); *H04N 5/2257* (2013.01)

(58) Field of Classification Search
CPC .......................... H04N 5/2254; H04N 5/2257
See application file for complete search history.

(56) References Cited

U.S. PATENT DOCUMENTS

2012/0162795 A1*   6/2012   Yoshimura ............. G02B 7/022
                                                           359/830
2016/0349475 A1*   12/2016   Horiuchi ................ G02B 7/021

\* cited by examiner

*Primary Examiner* — Nicholas G Giles
(74) *Attorney, Agent, or Firm* — IPro, PLLC; Na Xu

(57) ABSTRACT

The present application discloses an imaging camera, including: a lens holder; a first lens unit, a stop, a second lens unit arranged in the lens holder in a sequence from an object side to an image side. An outer diameter of the first lens unit is greater than an outer diameter of the second lens unit. The stop includes a first supporting area abutting against the first lens unit, a second supporting area abutting against the second lens unit, and a connecting area abutting against the lens holder and connecting the first supporting area to the second supporting area. The first lens unit presses the first supporting area and forces the second supporting area to abutting against the second lens unit.

7 Claims, 2 Drawing Sheets

IMAGING CAMERA

FIELD OF THE PRESENT DISCLOSURE

The present disclosure relates to the field of image capturing, and more particularly to an imaging camera.

DESCRIPTION OF RELATED ART

With development of technology, besides digital cameras, more and more portable electronic devices are equipped with image capturing functions. To achieve the image capturing function, a camera module is needed. Generally, a camera module includes a camera lens for collecting light reflected from an object, a sensor for receiving the light and converting the light to electrical signals, and processor for calculating the signals and outputting digital images.

A related imaging camera generally includes a lens holder and a plurality of lens units accommodated in the lens holder. Typically, the lens units are arranged by stacking one on another. Each lens unit includes an imaging area and a supporting area surrounding the imaging area. When one lens unit has a relatively greater diameter than a diameter of an adjacent lens unit, the supporting area of the lens unit with greater diameter is not easy to be aligned with the supporting area of the adjacent lens unit, which would badly affect the connection relationship between the two adjacent lens units. Further, the stability of the combination of all lens units is affected accordingly.

Therefore, it is desired that an improved imaging camera can be developed to overcome the disadvantages mentioned above.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby are only to explain the disclosure, not intended to limit the disclosure.

Figure 1:
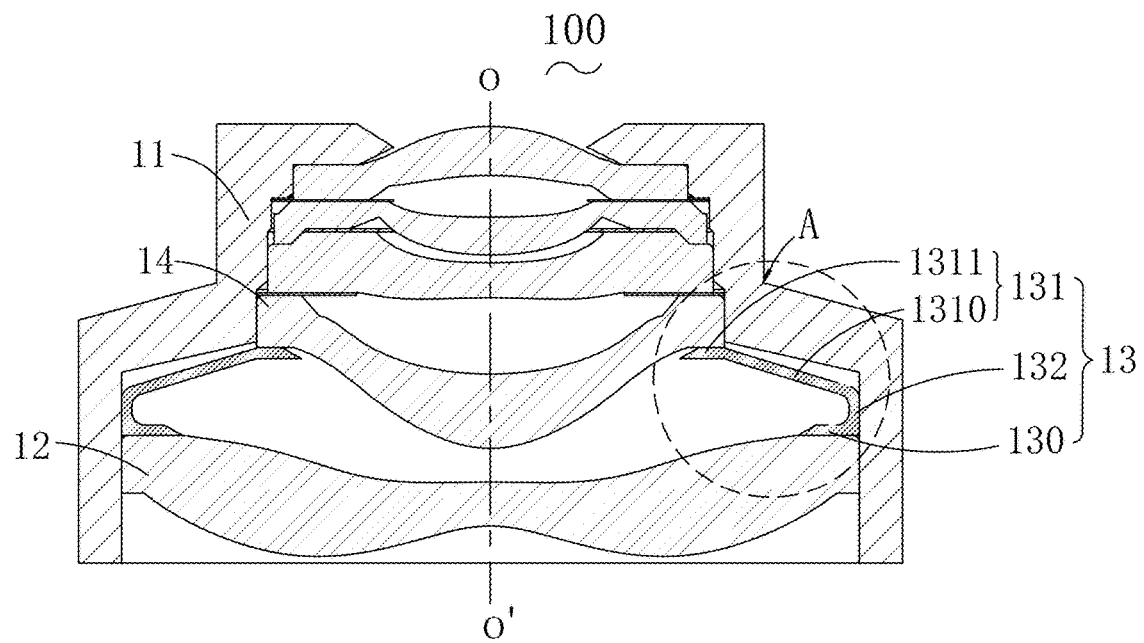
FIG. 1 is an illustrative cross-sectional view of imaging camera in accordance with a first exemplary embodiment of the present invention.

Referring to FIG. 1, an imaging camera 100 in accordance with a first exemplary embodiment of the present invention includes a lens holder 11 for accommodating a first lens unit 12, a stop 13 and a second lens unit 14 which arranged in a sequence from an object side to an image side. An outer diameter of the second lens unit 12 is greater than an outer diameter of the second lens unit 14. The stop 13 includes a first supporting area 130 abutting against the first lens unit 12, a second supporting area 131 abutting against the second lens unit 14, and a connecting area 132 connecting the first supporting area 130 with the second supporting area 131. The first lens unit 12 presses on the first supporting area 130 and forces the second supporting area 131 to move toward the second lens unit 14 and finally forces the second supporting area 131 to abut against the second lens unit 14.

Compared with the related art, the first lens unit 12 abuts against the first supporting area 130, and the second lens unit 14 abuts against the second supporting area 131, while the connecting area 132 abuts against the lens holder 11, which makes the first lens unit 12 not directly contact with the second lens unit 14. When the first lens unit 12 presses on the first supporting area 130 and forces the second supporting area 131 to move toward the second lens unit 14 and finally forces the second supporting area 131 to abut against the second lens unit 14. The stop 13 is provided with two supporting areas 130, 131 corresponding to the two lens units 12, 14 for offsetting the difference between the out diameters of the two lens units. The first lens unit 12 is connected to the second lens unit 14 via the stop 13. Meanwhile, the force from the first supporting area 130 is transmitted to the second supporting area 131 via the connecting area for producing moment in order to fix the positions of all elements, and to improve the stability of the imaging camera 100. In this embodiment, the first supporting area 130 abuts against an object side surface of the first lens unit 12, and the second supporting area 131 abuts against an image side surface of the second lens unit 14.

In the embodiment, the first supporting area 130 includes a first object side surface 1301 adjacent to the object side, a first image side surface 1302 opposite to the first object side surface and adjacent to the image side, and a first connecting surface 1303 extending from an edge of the first object side surface 1301 adjacent to an optical axis OO' to the first image side surface 1302 along a direction toward the optical axis OO', by which the first connecting surface 1303 obliquely faces the incident light so that the light arrives at the first connecting surface 1303 can be reflected along a direction away from the imaging area for improving the image quality.

It should be noted that the second supporting area 131 includes a slope part 1310 and a horizontal part 1311 abutting against the second lens unit 14. The slope part 1310 extends from the connecting area 132 toward the object side along a direction obliquely to the optical axis OO', and the horizontal part 1311 extends from the slope part 1310 toward and along a direction perpendicular to the optical axis OO'. The first supporting area 130 extends from one end of the connecting area 132 away from the slope part 1310 toward the image side, which makes slope part 1310 offset the difference between diameters of lens units along the direction perpendicular to the optical axis OO'. The stop 13 forms an opening along the optical axis OO', thus the light from the outside of the imaging camera 100 can be reflected several times between the first supporting area 130 and the second supporting area 131, which greatly weakens the stray light at the stop 13 and improves the image quality.

Figure 2:
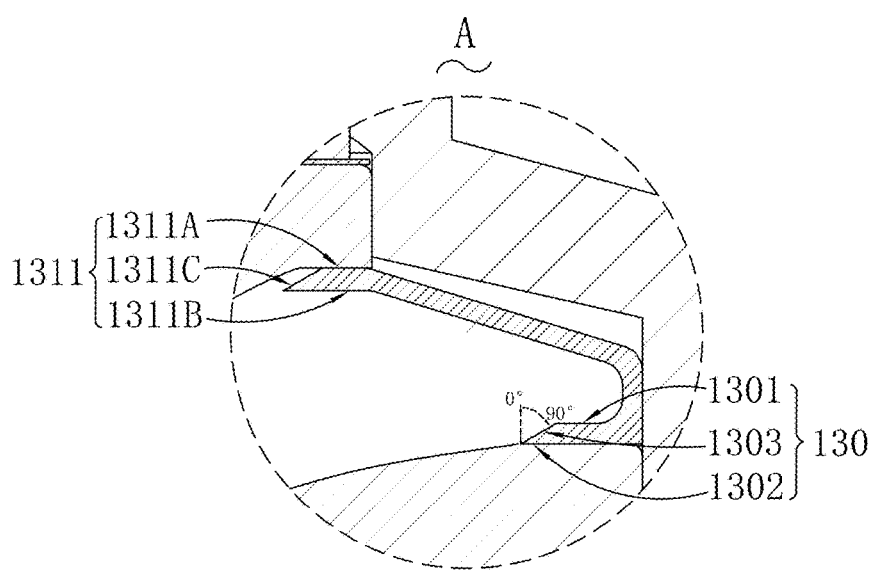
FIG. 2 is an enlarged view of Part A in FIG. 1.

In addition, as shown in FIG. 2, the horizontal part 1311 includes a second object side surface 1311A adjacent to the object side, a second image side surface 1311B opposite to the second object side surface 1131A, and a second connecting surface 1311C extending from an edge of the second object side surface 1311A adjacent to the optical axis OO' to the second image side surface 1311B, by which the second connecting surface 1311C obliquely faces the incident light so that the light arrives at the second connecting surface 1311C can be reflected along a direction away from the imaging area for improving the image quality.

Optionally, oblique angles of the first connecting surface 1303 and the second connecting surface 1311C could be adjusted within a possible range, as shown in FIG. 2, the angle between the first connecting surface 1303 and the optical axis OO' is between 0°~90° (including 0° but not including 90°). When the angle between the first connecting surface 1303 and the second connecting surface 1311C is 0°, the first connecting surface 1303 and the second connecting surface 1311C are both parallel to the optical axis OO'. The configuration of the second connecting surface 1311C and the second connecting surface 1303 is substantially same to the first connecting surface and the second connecting surface. In this embodiment, the stop 3 is black, so that the incident light can be adsorbed by the stop more effectively.

Optionally, in this embodiment, a contacting area between the first supporting area 130 and the first lens unit 12 is greater than a contacting area between the second supporting area 131 and the second lens unit 14, by which greater contacting area can be provided and stress between the supporting areas and the lens units can be reduced.

Figure 3:
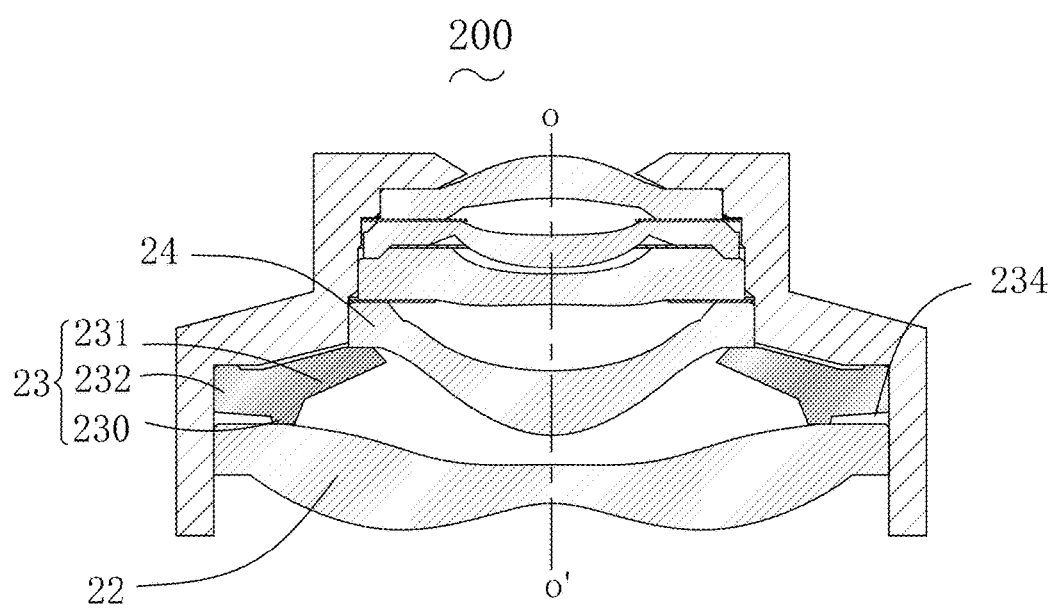
FIG. 3 is an illustrative cross-sectional view of an imaging camera in accordance with a second exemplary embodiment of the present invention.

Referring to FIG. 3, an imaging camera in accordance with another exemplary embodiment of the present invention is disclosed. In the first embodiment, the second supporting area 131 includes the slope part 1310 connected to the connecting area and a horizontal part 1311 abutting against the second lens unit 14. The slope part 1310 extends from the connecting area 132 toward the object side along a direction obliquely to the optical axis OO', and the horizontal part 1311 extends from the slope part 1310 toward and along a direction perpendicular to the optical axis OO'. While in the second embodiment, as shown in FIG. 3, the second supporting area 231 is a slope part 231 extending from the connecting area 232 toward the object side in a direction oblique to the optical axis OO'. The first supporting area 230 extends from a joint adjacent to the slope part 231 toward the optical axis OO'. The first supporting area 230 abuts against the object side surface of the first lens unit 22, and the second supporting area 231 abuts against the image side surface of the second lens unit 24. The connecting area 232 forms a gap 234 with the first lens unit 22.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An imaging camera, including:
   a lens holder;
   a first lens unit, a stop, a second lens unit arranged in the lens holder in a sequence from an object side to an image side;
   an outer diameter of the first lens unit being greater than an outer diameter of the second lens unit;
   the stop including a first supporting area abutting against the first lens unit, a second supporting area abutting against the second lens unit, and a connecting area abutting against the lens holder and connecting the first supporting area to the second supporting area; wherein the first lens unit presses the first supporting area and forces the second supporting area to abutting against the second lens unit.

2. The imaging camera as described in claim 1, wherein the second supporting area includes a slope part connecting with the connecting area and a horizontal part abutting against the second lens unit, the slope part extends from the connecting area toward the object side in a direction oblique to an optical axis; and the first supporting area extends from one end of the connecting area away from the slope part toward the optical axis.

3. The imaging camera as described in claim 2, wherein the first supporting area includes a first object side surface adjacent to the object side, a first image side surface opposite to the first object side surface, and a first connecting surface extending obliquely from an edge of the first object side surface adjacent to the optical axis toward the optical axis to the first connecting surface of the first image side surface.

4. The imaging camera as described in claim 2, wherein the second supporting area includes a second object side surface adjacent to the object side, a second image side surface opposite to the second object side surface, and a second connecting surface extending obliquely from an edge of the second object side surface adjacent to the optical axis toward the optical axis to the second connecting surface of the second image side surface.

5. The imaging camera as described in claim 2, wherein an contacting area between the first supporting area and the first lens unit is greater than a contacting area between the second supporting area and the second lens unit.

6. The imaging camera as described in claim 1, wherein the second supporting area is a slope part connecting with the connecting area, and the slope part extends from the connecting area toward the object side in a direction oblique to an optical axis.

7. The imaging camera as described in claim 1, wherein the stop is black.

* * * * *